Feb. 23, 1954 A. BERGERON 2,670,259
PISTON RING
Filed Nov. 22, 1949 2 Sheets-Sheet 1
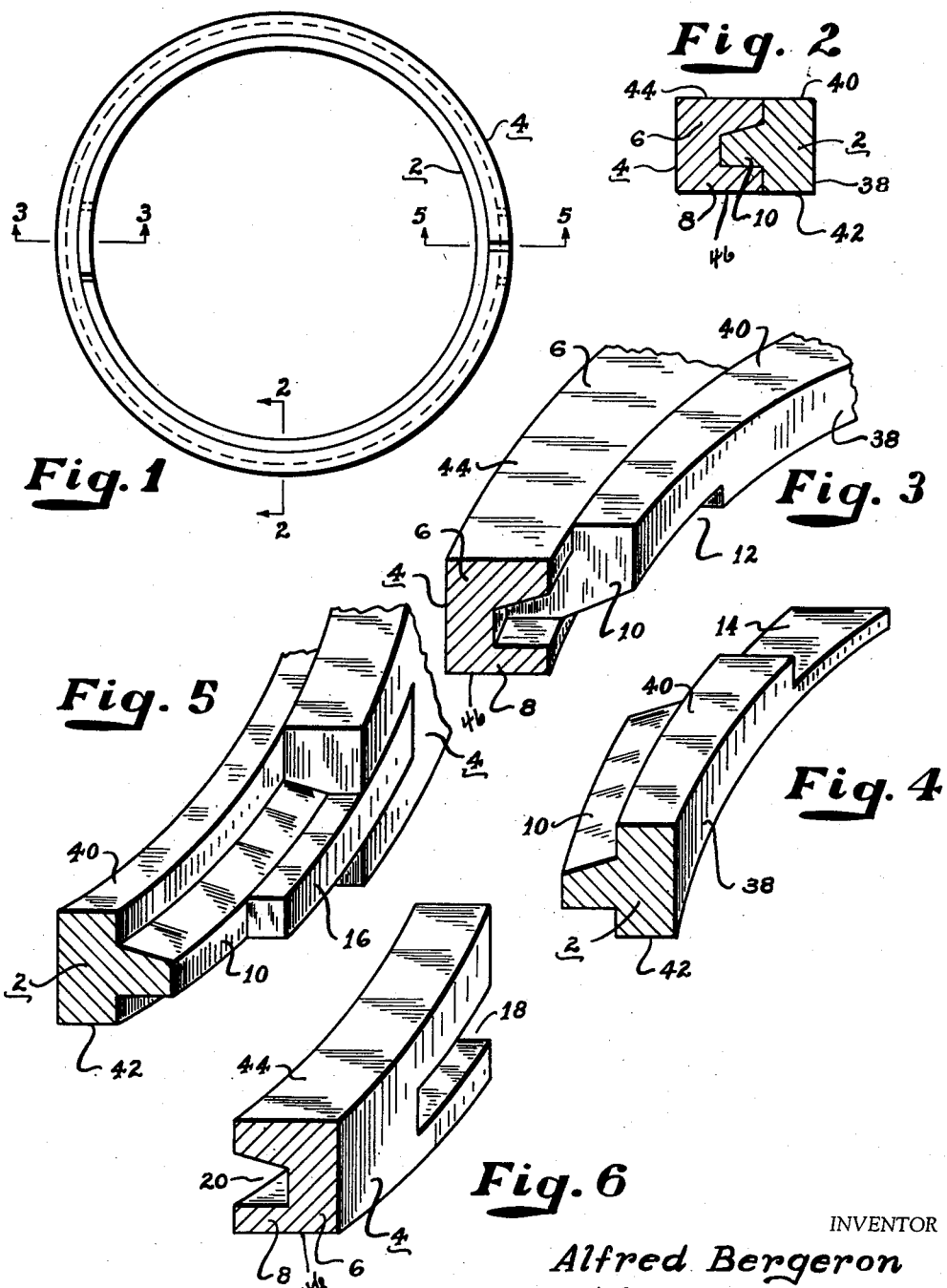
INVENTOR
Alfred Bergeron Feb. 23, 1954
A. BERGERON
2,670,259
PISTON RING
Filed Nov. 22, 1949
2 Sheets-Sheet 2
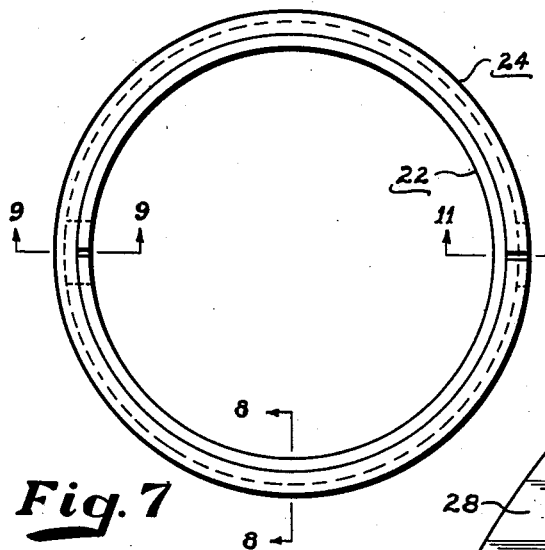
Fig. 7
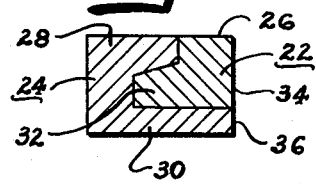
Fig. 8
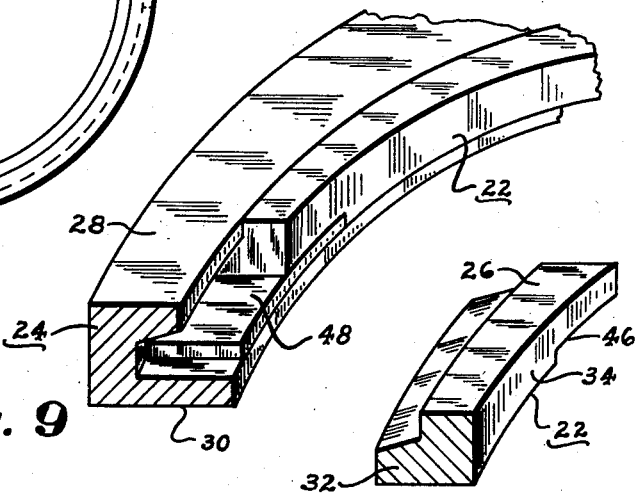
Fig. 9
Fig. 10
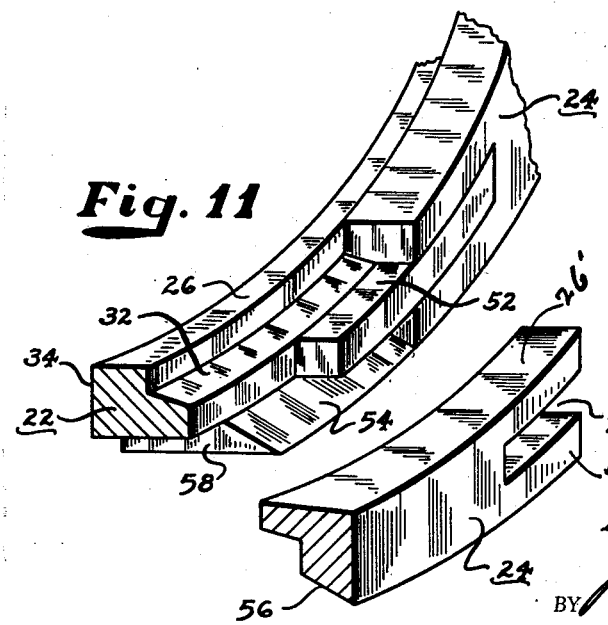
Fig. 11
Fig. 12
INVENTOR
Alfred Bergeron
BY *Mason, Mason & Sheridan*
ATTORNEYS Patented Feb. 23, 1954

2,670,259

UNITED STATES PATENT OFFICE 2,670,259

PISTON RING

Alfred Bergeron, Chicopee Falls, Mass.

Application November 22, 1949, Serial No. 128,892

10 Claims. (Cl. 309—47)

1

This invention relates to improvements in piston rings for the pistons of internal combustion engines and the like.

The principal objects of the invention are directed to the provision of a piston ring construction including outer and inner ring sections in combination with interlocking means.

All of the above objects I accomplish by means of such structure and relative arrangement of parts thereof, as will fully appear from the description below and various specific features which will be hereinafter set forth.

To the above cited and other ends and with the foregoing and various other novel features and advantages and other objects of my invention as will become more readily apparent as the description proceeds, my invention consists in certain novel features of construction and in the combination and arrangement of parts as will be hereinafter more particularly pointed out in the claims hereunto annexed and more fully described and referred to in connection with the accompanying drawings wherein:

Fig. 1 is a plan view of a piston ring construction embodying the novel features of the invention;

Fig. 2 is a sectional elevational view on the line 2—2 of Fig. 1;

Figure 3 is a broken-away perspective view taken on the line 3—3 of Figure 1;

Figure 4 is a perspective view of the inner ring section, partly in section, which engages the parts shown in Figure 3;

Figure 5 is a broken-away perspective view taken on the line 5—5 of Figure 1;

Figure 6 is a perspective view of one end of the outer ring section, partly in section, which engages the parts shown in Figure 5;

Figure 7 is a plan view of a second form of piston ring construction embodying some of the novel features of this invention;

Figure 8 is a sectional view taken on the line 8—8 of Figure 7;

Figure 9 is a broken-away perspective view taken on the line 9—9 of Figure 7;

Figure 10 is a perspective view of one end of the inner ring section which engages the parts shown in Figure 9;

Figure 11 is a perspective view partly in section taken on the line 11—11 of Figure 7; and Figure 12 is a perspective view of one end of the outer ring which engages the parts shown in Figure 11.

Referring now to the drawings more in detail, the invention will be fully described.

2

The ring construction of Fig. 1 includes an inner split ring section 2 and an outer split ring section 4.

The outer ring section 4 is generally U-shaped in cross section having upper and lower portions 6 and 8 with a groove extending inwardly from the outer side thereof, as shown in Fig. 2.

The inner ring section 2 is T-shaped in cross section and has an outwardly extending portion or rib 10 disposed in the groove of the outer section 4. The two ring sections are of the same thickness vertically with their respective upper and lower faces in the same planes. This provides a two-part piston ring fitting well and with a good seal in the ring groove of the piston with which the ring is designed to be used.

The upper side of the rib 10 preferably inclines outwardly and downwardly, as is best shown in Fig. 2. The rib, therefore, is tapered outwardly.

Section 4 has an upper surface 44 and lower surface 46, and section 2 has an upper surface 40 and a lower surface 42. These upper and lower surfaces of the sections as seen in Figure 2 are in the same plane.

As shown in Fig. 3, one end of the inner ring section 2 is cut away at 12 and the opposite end of said member is provided with a tongue 14 as shown in Fig. 4 which fits into said cut-away. Thus the opposite ends of the inner section are interengaged.

In the form of the invention shown in Fig. 7, an inner split ring section 22 has an outwardly projecting portion or rib 32.

An outer split ring section 24 has an upper part or flange 26 and a lower part or flange 30 with a groove between the two flanges. This ring section is more or less L-shaped with the portion 32 of the inner ring section fitting in the groove between the upper and lower parts as shown in Fig. 9. Preferably the upper side of the rib 32 is angularly disposed as shown in Fig. 9, whereby the rib is transversely tapered.

One end of the outer ring section 24 is cut away to provide an end 58 (see Fig. 11). Preferably the outer upper side thereof inclines downwardly and outwardly as shown at 54.

The other end of the outer ring section 24 is provided with tongues 26' as shown in Fig. 12, which engage the part 52 and the outer side of the inner ring section, whereby opposite ends of the said outer ring section are interengaged.

To prevent relative rotation of the ring sections 22 and 24, opposite ends thereof may be provided with notches such as 46 which receive a key 48 of the outer ring section (see Figs. 9 and 10).

The key may be secured to the inner ring section by any suitable soldering, brazing, or other operation.

Opposite ends of the outer ring section 4 of Figs. 1 and 2 may be provided with notches for a key associated with the inner ring section of the type shown in Figs. 9 and 10.

The split between opposite ends of the outer ring section and key will be located at a side thereof which is opposite or spaced circumferentially at a considerable angle from the split in the inner ring section.

A key 48 may be secured to the lower portion 30 of the outer ring section 24 after the manner described and the opposite ends of the said inner section may be provided with notches such as 46 (see Fig. 10). This key will be at a distance from the split in the outer section and will prevent rotation of the sections.

The keys 52 and 48 and associated parts serve to prevent relative rotation of the ring sections and as sealing means.

The invention may be embodied in other specific forms without departing from the essential characteristics thereof. Hence, the present embodiments are to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. A piston ring construction comprising in combination inner and outer split ring sections, said outer ring section provided with an inwardly extending annular groove between upper and lower flanges thereof, said inner ring section having an outwardly extending tapered rib disposed in and fitting said groove, a separate key secured to the rib and extending outwardly therefrom, the ends of the outer ring section being formed with notches and tongues fitting said key engaging either side thereof and forming a seal, and a second separate key secured to the outer ring section spaced circumferentially from the first key, the ends of the inner ring section being formed with notches fitting said key and forming a lock therewith.

2. A piston ring construction comprising in combination inner and outer split ring sections, said outer ring section provided with inwardly extending annular flanges with an annular groove therebetween, said inner ring section having an outwardly extending tapered annular rib disposed in and fitting said groove, the ring sections being of the same thickness and having their respective upper and lower faces in the same horizontal planes to fit in the piston ring groove in which the ring is designed to be used.

3. A piston ring construction comprising in combination inner and outer split ring sections of the same vertical thickness and with their respective upper and lower faces in the same parallel planes, said outer ring section provided with inwardly extending annular flanges with an annular groove therebetween, said inner ring section having an annular rib disposed in and fitting said groove and means holding said sections against relative rotation comprising a separate key secured to the inner section and recesses in opposite ends of the outer section fitting said key to form a seal preventing vertical blow-by.

4. A piston ring construction as defined in claim 3 wherein the rib of the inner ring section is tapered in cross-section.

5. A piston ring construction comprising in combination inner and outer split ring sections, said outer ring section provided with an inwardly extending annular groove between upper and lower sides thereof, said inner ring section having an outwardly extending portion disposed in said groove, the upper side of said portion being inclined downwardly and outwardly and the upper side of the groove being complemental thereto, opposite ends of one of said ring sections provided with interengaging recesses and tongues, and means holding said sections against relative rotation, said means including a separate key secured to said inner ring outwardly extending portion extending outwardly therefrom and recesses in opposite ends of the other section receiving said key.

6. A piston ring construction comprising in combination inner and outer split ring sections, said outer ring section provided with an inwardly extending annular groove between upper and lower sides thereof, said inner ring section having an outwardly extending portion disposed in said groove, the upper side of said portion being inclined downwardly and outwardly and the upper side of the groove being complemental thereto, opposite ends of one of said ring sections provided with interengaging recesses and tongues, and means holding said sections against relative rotation, said means including a separate key secured to the outwardly extending portion of the inner section and notches provided in opposite ends of the outer section in which said key is received.

7. A piston ring construction comprising in combination inner and outer split ring sections, said outer ring section provided with an inwardly extending annular groove between upper and lower sides thereof, said inner ring section having an outwardly extending portion disposed in said groove, opposite ends of one of said ring sections being provided with inter-engaging recesses and tongues and means holding said sections against relative rotation including a key secured to said inner ring outwardly extending portion and notches provided in the opposite ends of the other section in which said key is received.

8. A piston ring construction comprising in combination inner and outer split ring sections, said outer ring section provided with an inwardly extending annular groove between upper and lower sides thereof, said inner ring section having an outwardly extending portion disposed in said groove, the upper side of said portion being inclined downwardly and outwardly and the upper side of the groove being complemental thereto, opposite ends of one of said ring sections provided with interengaging recesses and tongues, and means holding said sections against relative rotation, said means including a separate key secured to the outwardly extending portion of the inner section and notches provided in opposite ends of the outer section in which said key is received, the lower side adjacent one of the ends of said outer ring section beneath said key having a downwardly inclined portion, and the lower side adjacent the other end of said outer ring section also lying beneath said key having a correspondingly downwardly inclined portion which is located beneath the first-named downwardly inclined portion of said first-named end.

9. A piston ring construction comprising in combination inner and outer split ring sections, said outer ring section provided with an inwardly extending annular groove between upper and lower sides thereof, said inner ring section having an outwardly extending portion disposed in said groove, the upper side of said portion being inclined downwardly and outwardly and the upper side of the groove being complemental thereto, opposite ends of one of said ring sections provided with interengaging recesses and tongues, and means holding said sections against relative rotation, said means including a separate key secured to said inner ring outwardly extending portion extending outwardly therefrom and recesses in opposite ends of the other section receiving said key, the lower side adjacent one of the ends of said outer ring section beneath the key of said one ring section having a downwardly inclined portion, and the lower side adjacent the other end of said outer ring section also lying beneath said key having a correspondingly downwardly inclined portion which is located beneath the first-named downwardly inclined portion of said first-named end.

10. A piston ring construction comprising in combination inner and outer split ring sections, said outer ring section provided with an inwardly extending annular groove between upper and lower sides thereof, said inner ring section having an outwardly extending portion disposed in said groove, opposite ends of one of said ring sections being provided with interengaging recesses and tongues and means holding said sections against relative rotation including a key secured to said inner ring outwardly extending portion and notches provided in the opposite ends of the other section in which said key is received, the lower side adjacent one of the ends of said outer ring section beneath the key of said one ring section having a downwardly inclined portion, and the lower side adjacent the other end of said outer ring section also lying beneath said key having a correspondingly downwardly inclined portion which is located beneath the first-named downwardly inclined portion of said first-named end.

ALFRED BERGERON.

References Cited in the file of this patent

UNITED STATES PATENTS

| Number | Name | Date |
|--------|------|------|
| 684,617 | Rathbun | Oct. 15, 1901 |
| 1,200,701 | Blumberg | Oct. 10, 1916 |
| 1,285,780 | Muratta | Nov. 26, 1918 |
| 1,774,002 | Hardy | Aug. 26, 1930 |
| 2,092,413 | Farmer | Sept. 7, 1937 |
| 2,190,204 | Bergeron | Feb. 13, 1940 |
| 2,485,862 | Caza | Oct. 25, 1949 |

FOREIGN PATENTS

| Number | Country | Date |
|--------|---------|------|
| 241,508 | Switzerland | Aug. 1, 1946 |